United States Patent Office 2,913,193
Patented Nov. 17, 1959

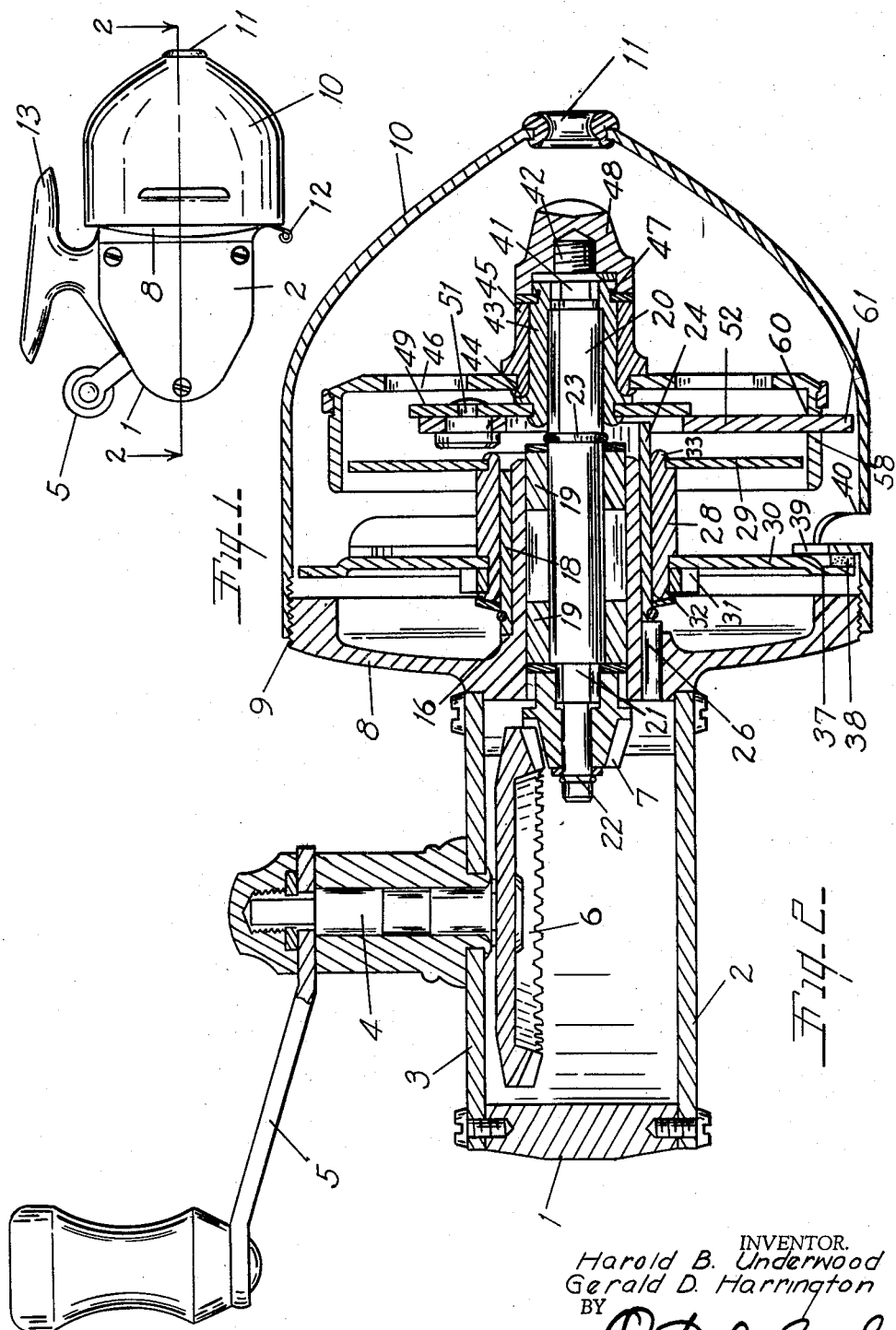

2,913,193

FISHING REEL OF THE SPINNING REEL TYPE

Harold B. Underwood and Gerald D. Harrington, Kalamazoo, Mich., assignors to Shakespeare Company, Kalamazoo, Mich.

Original application March 5, 1954, Serial No. 414,352. Divided and this application July 14, 1958, Serial No. 748,528

4 Claims. (Cl. 242—84.5)

This invention relates to improvements in fishing reels of the spinning reel type.

The principal objects of this invention are:

First, to provide a fishing reel of the spinning type in which the spool for storing the fish line is rotatably mounted and in which the case for enclosing the spool and the line winding mechanism coacts with the spool to apply an adjustably variable friction drag to the spool.

Second, to provide a spinning reel in which the case enclosing the line spool and line winding mechanism is provided with integral flanges struck inwardly from the body of the case to form drainage openings and to also act as a brake shoe for applying drag to the line spool.

Third, to provide a fishing reel of the spinning type in which the drag on the rotatable line spool can be easily adjusted during use of the reel simply by turning the case which encloses the spool and the line winding mechanism.

Other objects and advantages of the invention will be apparent from the consideration of the following description and claims.

Fig. 1 is a side elevational view of the assembled reel.

Fig. 2 is a transverse horizontal cross sectional view taken along the plane of the line 2—2 in Fig. 1.

The present reel constitutes an improvement of and embodies some features of the spinning reel described in the patent to Henry G. Shakespeare and Gerald D. Harrington, No. 2,521,543, issued September 5, 1950. The subject matter of this application has been divided from our application Serial #414,352, filed March, 5, 1954.

The reel of the present invention includes a gear case 1 having removable side plates 2 and 3. A shaft 4 is journaled in the side plate 3 and provided with a crank 5 on its outer end. A beveled gear 6 is connected to the shaft within the gear case 1 and meshes with a beveled pinion 7 also within the gear case.

The forward end of the gear case is enlarged in an integral circular wall 8 forming the back wall of the reel housing. The periphery of the wall 8 is externally threaded as at 9 and adjustably coacts with internal threads in the rear of the cylindrical housing 10. The forward end of the housing 10 is converged or tapered to an eye 11 through which the fish line is adapted to extend. A spring pressed detent 12 carried on the plate 8 yieldably engages the rear edge of the cylindrical housing 10 to frictionally retain the housing in its adjusted position on the threads 9. The top of the gear case 1 is provided with an upwardly facing reel seat 13.

Within the cylindrical housing 10 the wall 8 is provided with a centrally located forwardly projecting cylindrical bearing support 16 that receives and supports the tubular bushing 18 around its exterior. Interiorly the bearing support is provided with bearings 19 which rotatably support a spindle 20. The rear end of the spindle 20 has the previously mentioned beveled pinion 7 secured thereto. The sides of the spindle are flatted as at 21 to non-rotatably engage the hub of the pinion and a snap ring 22 axially retains the pinion on the spindle. The spindle 20 projects forwardly beyond the bearing support 22 and is axially retained by a second snap ring 23. The cylindrical bushing 18 has a semi-circular segmental portion 24 which projects forwardly from the remainder of the bushing. The end edges of this segmental projection provide axially projecting stops spaced radially and laterally from the spindle and located at angularly spaced points there around. A pin 26 pressed axially through the wall 8 of the gear box engages in an axial slot in the rear end of the bushing 18 as shown in Figure 2 to prevent rotation of the bushing on the bearing support 16.

Rotatably mounted on the exterior of the bushing 18 is a line storage spool consisting of a tubular hub 28 and front flange 29 and rear flange 30. Rearwardly of the rear flange 30 on the hub 28 is a click wheel 31 that is clamped to the hub and rear flange by turning the end of the hub 28 radially outwardly as at 32. The front flange 29 of the spool is retained on the hub by turning the forward end of the hub radially outwardly as at 33.

The rear flange 30 of the spool is rearwardly offset around its periphery as at 37 to form an annular friction surface which is engaged by and coacts with friction faces 38 mounted on the rear sides of segmental flanges 39 struck inwardly of the cylindrical housing 10 at angularly spaced positions around the housing. The formation of the flanges 39 performs the dual function of providing a support for the friction faces 38 and also providing drain openings 40 in the housing so that the water carried into the housing with the line can drain away. By adjusting the housing 10 on the threads 9 the degree of braking friction applied to the surface 37 and the line spool can be adjusted to suit the desires of the angler.

The forward end of the spindle 20 is provided with a flattened portion 41 and a threaded stud 42 forwardly of the flattened portion. A bushing 43 is sleeved on the forward end of the spindle and provided with flatted surfaces non-rotatably engaged with the flattened portion 41 of the spindle so that the bushing rotates with the spindle. The exterior of the bushing is provided with a forwardly facing shoulder 44. The bushing 43 and its shoulder 44 relatively rotatably support and receive the hub 45 of a line guide member indicated generally at 46. The line guide member is permanently and rotatably retained on the bushing by a snap ring 47. The bushing 43 and line guide member are removably retained on the forward end of the spindle by the nut 48.

The rear end of the bushing 43 has a line pick-up arm 49 non-rotatably secured thereto by turning the ear end of the bushing outwardly. The arm 49 carries a pivot pin 51 disposed eccentrically with respect to the spindle 20 and the pin 51 pivotally supports a line pick-up member 52 which is lapped along side of arm 49 and is disposed in chordal relation to the line guide member 46.

The circular line guide member 46 has a cylindrical flange 58 projecting rearwardly from its periphery and embracing the forward flange 29 of the spool. The previously described line pick-up member 52 is provided with a pick-up finger 61 on its end adapted to be projected through a hole 60 in the cylindrical flange 58. The details of the construction and operation of the line pick-up finger 61 and the line guide member 46 are more particularly described and claimed in our above mentioned co-pending application. In operation, the fish line stored on the hub 28 is directed radially outwardly over the periphery of the line guide member 46 and the forward end is directed radially inwardly to the eye 11. If the line pick-up finger 61 is retracted radially inwardly of the flange 58, the running end of the fish line will uncoil or pay out spinning or traveling around the periphery of the line guide member. None of the parts of the reel rotate so the line is not subjected to any drag which conditions is desirable as in casting.

When it is desired to wind in the fish line or control its paying out the pick-up finger 61 is projected radially through the flange 58 intercepting the line as it spins around the line guide member. Since the line can no longer spin freely around the line guide member the paying out operation stops unless the spool 28 can rotate to progressively deliver a turn or coil of the fish line to the point where the line is laid across the line guide member adjacent to the line wind finger. In this condition of the reel, regulating the friction applied to the flange 37 by the friction facings 38 becomes effective to regulate the tension on the line for limiting the cast or for playing a fish.

When it is desired to retrieve or wind in the line, the line guide member 46 with the line wind finger 61 projecting therefrom, is rotated faster than the rotation of the spool 28 so that the line wind finger progressively lays a turn of the line over the forward flange 29 of the spool.

Other forms of line winding and line guiding mechanisms may be used in the casing 10 as the line storage spool 28 and its frictional engagement with the friction flanges 39 on the housing will function regardless of the details of the line guide member and the line winding finger.

Having thus described the invention what is claimed as new and desired to secure by Letters Patent is:

1. In a spinning reel having a frame element with a spool support and a spindle projecting forwardly therefrom, the combination of a spool rotatably mounted on said support, a line wind member carried by said spindle forwardly of said spool and cooperative with said spool, a cylindrical housing threadedly engaged with said support and enclosing said spool and line wind member, said housing having a conical forward end with a line guide eye at the apex thereof, segmental flanges struck inwardly from angularly spaced portions of said housing, and friction facings on said flanges cooperative with the rear flange of said spool.

2. In a spinning reel having a frame element with a spool support and a spindle projecting forwardly therefrom, the combination of a spool rotatably mounted on said support, a line wind member carried by said spindle forwardly of said spool and cooperative with said spool, a housing threadedly engaged with said support and enclosing said spool and line wind member, said housing having angularly spaced flanges struck inwardly therefrom and constituting friction drag members disposed in front of and coacting with the rear flange of the spool.

3. In a spinning reel having a frame element with a spool support projecting forwardly therefrom, the combination of a spool rotatable on said support, a cylindrical housing threadedly engaged with said frame element surrounding said spool, said housing having a plurality of segmental flanges struck inwardly therefrom and adapted to frictionally engage a flange of said spool upon axial adjustment of said housing on said frame element.

4. In a spinning reel having a frame element with a spool support projecting therefrom, the combination of a spool rotatable on said support, a cylindrical housing threadedly engaged with said frame element and surrounding said spool, and having a guide eye and a flange struck inwardly therefrom and adapted to frictionally engage a flange of said spool upon axial adjustment of said housing on said frame element.

No references cited.